Figure 6:
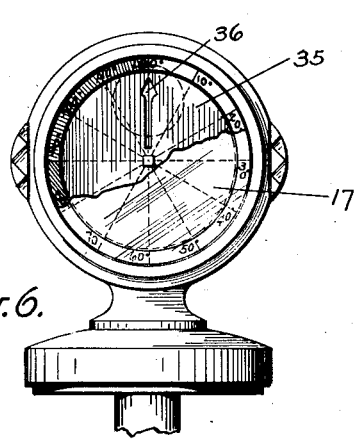

Sept. 15, 1925.
J. V. BLUEBAUGH
MOTOR METER
Filed July 5, 1924
1,553,743
2 Sheets-Sheet 1
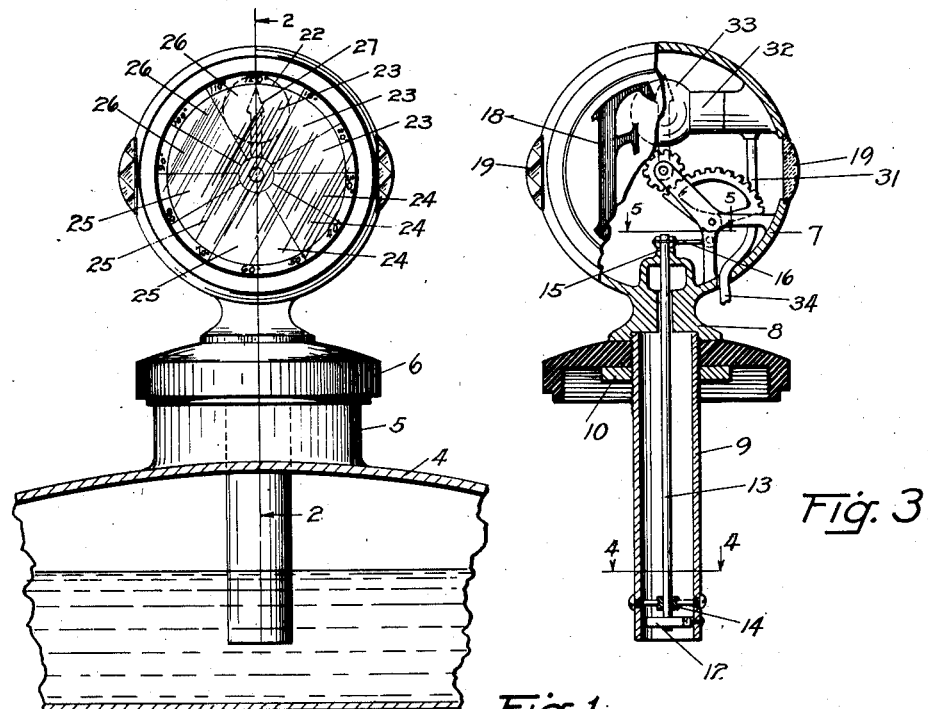
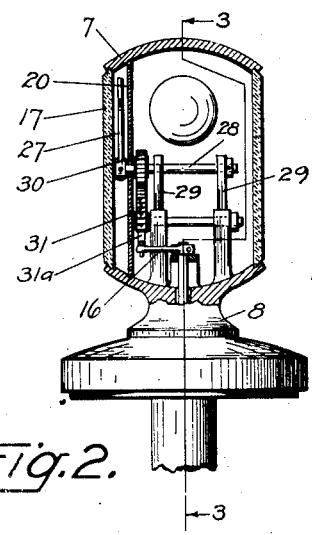
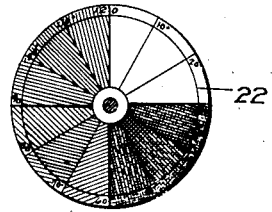
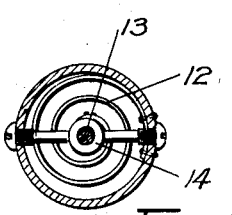
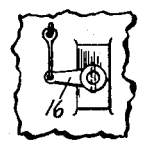
INVENTOR.
J. V. Bluebaugh
BY
ATTORNEY.

Sept. 15, 1925.

J. V. BLUEBAUGH

MOTOR METER

Filed July 5, 1924

1,553,743

2 Sheets-Sheet 2

INVENTOR.
J.V. Bluebaugh
BY
ATTORNEY.

Patented Sept. 15, 1925.

1,553,743

UNITED STATES PATENT OFFICE.

JAMES V. BLUEBAUGH, OF JOHNSTOWN, COLORADO.

MOTOR METER.

Application filed July 5, 1924. Serial No. 724,409.

*To all whom it may concern:*

Be it known that I, JAMES V. BLUEBAUGH, a citizen of the United States, residing at Johnstown, in the county of Weld and State of Colorado, have invented certain new and useful Improvements in Motor Meters, of which the following is a specification.

This invention relates to temperature indicators for internal combustion engines, commonly known as motometers, and it is an object of the invention to provide in an instrument of this character, improved means for indicating the temperature of an engine to which it is applied, on a circular scale having a continuous succession of indicia to show the temperature variations in graduated steps.

Another object of the invention is to indicate the variations in temperature of the engine on a scale of the above described character, divided into graduations of different colors.

A further object is to render the indicia of the scale denoting the temperature of the engine clearly visible at night as well as in daytime by the passage of light, and still other objects reside in details of construction and novel arrangements of parts hereinafter fully described with reference to the accompanying drawings.

In the drawings in the several views of which like parts are similarly designated—

Figure 7:
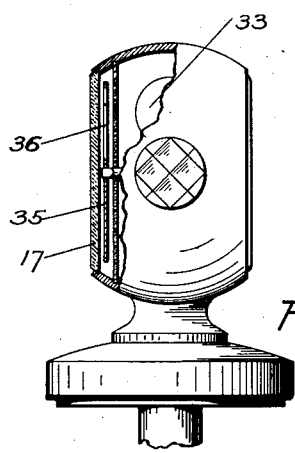
Figure 8:
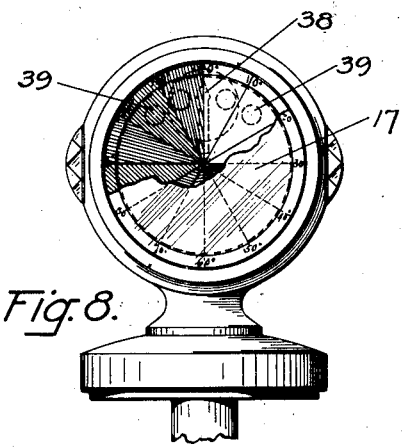
Figure 9:
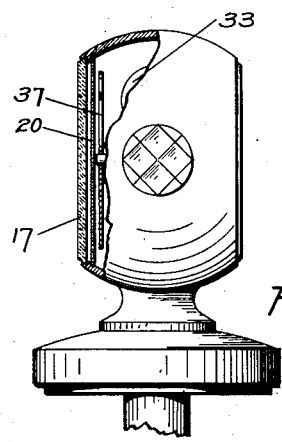
Figure 10:
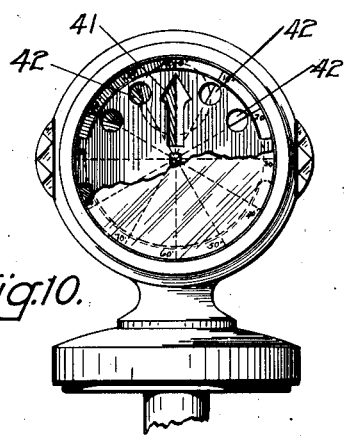
Figure 11:
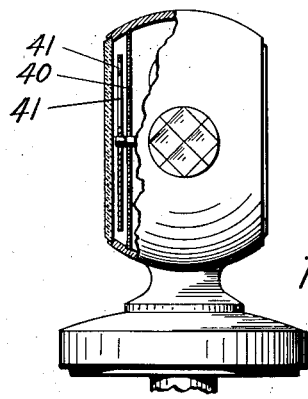

Figure 1 represents in elevation, the preferred form of my invention in its operative relation to the radiator of a motor vehicle;

Figure 2, a fragmentary section along the line 2—2, Figure 1;

Figure 3, a sectional elevation taken on the line 3—3, Figure 2;

Figure 4, an enlarged section in the plane indicated by the line 4—4 in Figure 3;

Figure 5, a section on the line 5—5 in Figure 3;

Figure 6, a sectional front elevation of a modification of the invention;

Figure 7, a partially sectional side elevation of the modification shown in Figure 6;

Figure 8, a view similar to Figure 6, showing a second modified construction of the invention;

Figure 9, a view similar to Figure 7 showing a side elevation, partially in section, of the construction illustrated in Figure 8;

Figure 10, a partially sectional front elevation of a third modification of the invention;

Figure 11, a sectional side elevation of the form shown in Figure 10; and

Figure 12, a face view of the dial included in the preferred form of the invention illustrated in Figures 1 to 5 inclusive.

Referring first to Figures 1 to 5 of the drawings, the reference character 4 designates the upper portion of the radiator of a motor vehicle, including a filler neck 5, and 6 indicates the screw cap which normally closes the filler neck and which provides a base for the support of the instrument in which the distinctive features of the present invention are embodied.

The instrument comprises a circular housing 7 provided with a foot 8 for its support on the radiator cap.

A tube 9 screw-connected with the foot of the casing extends through a central opening of the cap, and a nut 10 screwed upon the tube locks the instrument in place by engagement with the inner surface of the cap.

The tube which in the use of the invention projects into the radiator a sufficient distance to be subject to variations in the engine temperatures, encloses a thermostatic element preferably made in the form of spiral 12 of thin metal one end of which is fastened to the wall of the tube adjacent the lower end thereof as best shown in Figure 4.

A rod 13 coaxial with the tube is supported for rotation in bearings 14 and 15; its lower extremity is attached to the inner end of the thermostatic spiral and its upper end which projects through a bore of the foot 8 into the casing 7, is provided with a laterally extending crank arm 16 to convert its rotary motion into an operative movement of the indicatory element of the instrument, hereinafter to be described.

The casing is closed at its front (i. e., the face which is seen from the driver's seat of a motor vehicle when the instrument is mounted upon the radiator thereof) by a glass plate 17 and its opposite side may be ornamented with a club or society emblem, the monogram of the owner of the vehicle, the trademark under which the vehicle is sold or any other distinguishing mark or design, as indicated at 18 in Figure 3.

The casing may also be provided with openings in its sides which when closed by crystals 19 of different colors enhance the ornamental value of the device and aid in indicating the direction in which the vehicle is headed.

Fastened in spaced relation to the glass plate 17 is a dial plate 20 shown in detail in Figure 12. The plate 20 which is preferably made of glass or other transparent material is divided by equidistant radial graduation lines 21 into a scale which commencing at a zero point at the top of the plate in a circle 22 adjacent the periphery of the dial are designated by progressively increasing temperature degrees or other distinguishing marks.

The segmental spaces between the radial lines are furthermore distinguished from each other by different colors and it is a feature of the invention to arrange these different colored sections in series of, for example, three in each. Thus, referring particularly to Figure 12 in which the dial is shown separate from the other parts of the instrument, the first three sections 23, beginning at the zero point and progressing in clockwise direction, are white, the next three sections 24 are yellow, the next following sections 25 are green, and the remaining sections 26 between the white and the green, are red.

It is the object of the colors to designate in co-operation with a movable indicating element, varying conditions of the engine by striking and readily distinguished signals, the white sections showing the minimum temperature before the engine is in normal operation, the series of yellow sections indicating the normal condition of the engine, the green series, an increase of temperature above the normal, and the red sections, a dangerous condition caused by an abnormal raise in temperature, requiring immediate attention.

The indicating element of the instrument above referred to consists of a pointer 27 mounted in the space between the plates 17 and 20 to rotate about an axis in the center of the dial.

A shaft 28 to which the pointer is fastened is rotatably supported in bearings 29 in the casing and it carries a pinion 30 meshing with a segmental gear 31 which by means of an arm 31ª is operatively connected with the crank arm 16 on the head of the rotary rod 13 of the thermostatic element hereinbefore described.

The casing has interiorly a socket 32 for the support of an incandescent lamp 33 which by means of conductors passing through a tube 34 outside the casing may be connected in the lighting and ignition circuit of the power plant of the motor vehicle to which the instrument is applied.

In the operation of the invention, the pointer 27 is rotated by the rod 13 of the thermostatic element in accordance with the increasing or decreasing temperatures of the engine, imparted to the cooling water which circulates through the radiator.

The position of the pointer relative to the scale of the dial designates the condition of the engine to the driver of the vehicle, and the passage through the colored sections of the dial, of light filtering in day time through the side openings of the casing or emitted at night from the lamp inside the casing or from headlights of approaching vehicles, clearly indicates the section of the dial partially obscured by the pointer and thereby aids in attracting the attention of the occupants of the vehicle to variations in the condition of the engine.

It will be observed that the pointer is capable of traversing a complete circle and that in consequence even minute variations in the temperature of the engine are readily observed as the pointer passes from one graduation to another or from one section of each colored series to another or from one series of sections to a following differently colored series.

In Figures 6 and 7 of the drawings is depicted a modification of the invention in which the temperature-designating element comprises a rotary disk 35 provided with a perforation 36, cut preferably in the form of an arrow or a pointer, which when the disk is in its normal position registers with the zero graduation of the dial which is divided and colored as in the first described construction.

The disk 35 which is made of opaque material is smaller in diameter than the dial so that the temperature designating marginal portion of the latter is continuously exposed.

In the operation of the instrument, the light passing through the transparent or translucent dial plate and the perforation of the rotary opaque disk, clearly shows the position of the perforation on the dial while the relative position of the colored segment of the dial with which the perforation is in register is readily ascertained by the exposed portion of the dial around the disk.

The construction illustrated in Figures 8 and 9 differs from the others in that the rotary disk which in the form shown in Figures 6 and 7 was disposed in the space between the glass plate and the dial plate is placed back of the latter.

The disk 37 has in addition to the arrow-shaped perforation 38, smaller perforations 39 at opposite sides thereof, to denote by the passage of light the position of the disk relative to the sections of the scale.

In Figures 10 and 11, the dial consists of an unmarked opaque plate 40 and a rotary disk 41 which as in the form shown in Figures 6 and 7, is interposed between the glass plate and the dial, is transparent or translucent and bears the graduated, colored scale.

The dial has a plurality of perforations 42 and the light shining through these perforations indicates the temperature variations by the various colors of the disk as they are brought in register with the openings by the rotary movement of the disk.

It will be apparent that in the above described modifications, mechanism similar to that of the preferred form of the invention is employed to rotate the disk by temperature variations of the engine to which the instrument is applied, and that changes in the construction and arrangement of the parts of the instrument, other than those herein shown and described, may be resorted to within the spirit of my invention as defined in the hereunto appended claims.

Having thus described my invention, what I claim and desire to secure by Letters Patent is:

1. A thermostatic motor meter comprising an upright casing, two flat members one of which is mounted for rotation about the horizontal axis, placed one behind the other at the front of the casing, one of the members bearing in a substantially vertical plane, a circular scale having differently colored divisions, and an indicatory aperture in one of the members for the passage of light rays, and means for illuminating the motor meter.

2. A thermostatic motor meter comprising an upright casing, two flat members one of which is mounted for rotation about the horizontal axis, placed one behind the other at the front of the casing, one of the members bearing in a substantially vertical plane, a circular scale having differently colored divisions, and an indicatory aperture in one of the members for the passage of light rays, and also having a concentric series of apertures for the passage of light rays and means for illuminating the motor meter.

In testimony whereof I have affixed my signature.

JAMES V. BLUEBAUGH.